(No Model.)
C. J. VAN DEPOELE.
SAFETY DEVICE AND SIGNAL FOR ELECTRIC MOTORS OR GENERATORS.
No. 394,525. Patented Dec. 11, 1888.
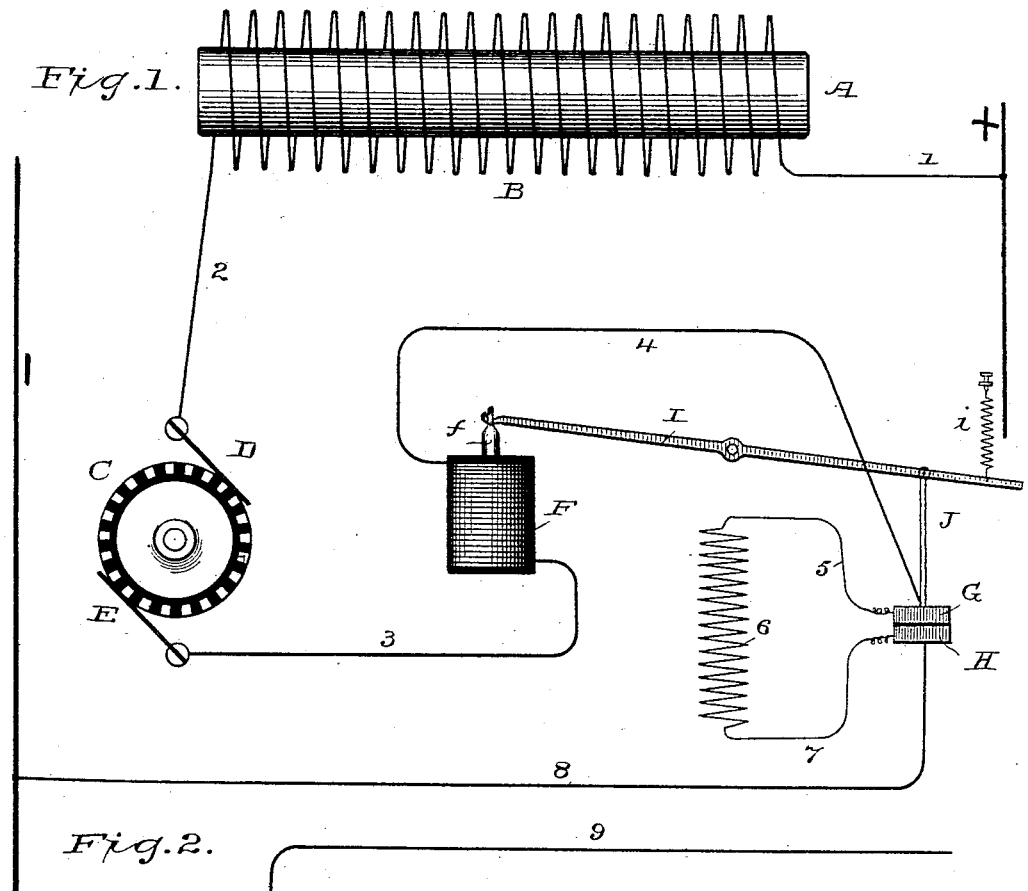
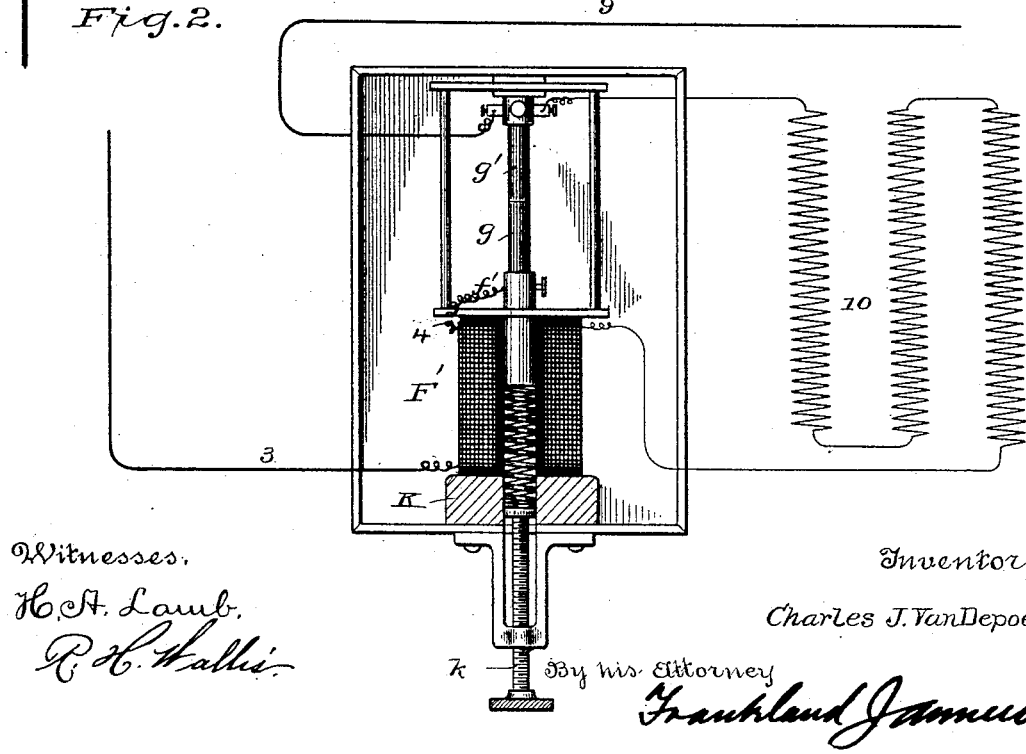
Witnesses:
H. A. Lamb.
R. H. Wallis.
Inventor,
Charles J. VanDepoele
By his Attorney
Frankland James

UNITED STATES PATENT OFFICE.

CHARLES J. VAN DEPOELE, OF CHICAGO, ILLINOIS.

SAFETY DEVICE AND SIGNAL FOR ELECTRIC MOTORS OR GENERATORS.

SPECIFICATION forming part of Letters Patent No. 394,525, dated December 11, 1888.

Application filed June 6, 1888. Serial No. 276,254. (No model.)

*To all whom it may concern:*

Be it known that I, CHARLES J. VAN DEPOELE, a citizen of the United States, residing at Chicago, in the county of Cook, State of Illinois, have invented certain new and useful Improvements in Safety Devices and Signals for Electric Motors or Generators, of which the following is a description.

The present invention relates to devices for preventing injury to the insulation of electric motors or generators by the passage of extra heavy currents; and it consists, broadly, in the placing in circuit with or in the circuit of an electric machine or generator of a resistance somewhat less than the insulation resistance of the machine or generator, so that in case of danger to the insulation the internal resistance of the motor or generator will be so greatly increased as to prevent the passage of the extraordinary current and the consequent overheating of the conductors and destruction of the insulation.

The details of arrangement, construction, and operation of the device shown in the accompanying drawings by way of illustration will be hereinafter pointed out and referred to in the appended claims.

In the drawings, Figure 1 is a theoretical diagram of a dynamo-electric machine embodying my invention. Fig. 2 is a detail view showing a desirable form of the safety apparatus shown theoretically in Fig. 1.

Similar letters denote like parts throughout.

In the drawings, A represents the core of the field-magnet, upon which are wound the magnetizing-coils B.

C represents the commutator, upon which bear the usual brushes, D E. When the apparatus represented is used as a motor, the current may enter through the field-magnet coils by conductor 1, passing thence by conductor 2, commutator-brush D, to the commutator and armature, issuing by brush E, and passing thence by conductor 3 to an electro-magnet or solenoid, F. From the solenoid F the main current passes by conductor 4 to a block, G, of conducting material, preferably carbon. A second block, H, of similar material, is mechanically held against the block G. From the block G extends a conductor, 5, which connects with a resistance, 6, to the other extremity of which is attached a conductor, 7, leading to the other block, H. The said resistance, being relatively high and in derivation from the separable blocks G H, will prevent the actual breakage of the main circuit when said blocks are separated. The main circuit is continued through conductor 8, which is attached directly to the block H. The solenoid F is provided with a moving plunger, *f*, but may of course be supplanted by an electro-magnet and an armature, if desired. The plunger *f* is, as shown, connected to a pivoted lever, I, the opposite extremity of which is held down or in opposition to the action of the solenoid F by an adjusting-spring, *i*. The free end of the lever I is connected with the block G by a suitable link or connection, J, so that when less than a predetermined amount of current is flowing in the main circuit, whether the machine is operating as a generator or motor, the tension-spring *i* will prevail against the attractive force of the solenoid F and hold the blocks G and H in contact.

The resistance 6, which spans the carbon contacts G and H, is equivalent to the counter electro-motive force of the motor or generator when performing their maximum duty. In case of the presence of an extraordinary current when the machine is connected in a multiple-arc circuit and the contacts G H are separated by the action of the electro-magnet or solenoid F, the circuit will be maintained through said derived circuit, and a sufficient current pass therethrough to maintain an operative condition, while at the same time the necessary protection will be afforded and the safety device be at all times ready for operation in case of a sudden rise of potential in the main circuit, which is represented by conductors marked + and −. As applied to a generator, the device will have an analogous use. For example, when the generator is used to supply current of constant potential but varying intensity to a multiple-arc circuit— as, for instance, that of an electric railway— it frequently happens that the motors are all or nearly all thrown into operation at about the same time. This for a moment will so greatly lower the resistance of the working-circuit as to practically short-circuit the generator, and this danger exists frequently and continues in every instance until the several motors have been speeded up sufficiently to produce a counter electro-motive force, which will operate as a resistance to prevent the flow of too much current therethrough. In such a case the device herein described should be placed in parallel similarly with the other translating devices in circuit at some point convenient to the generator, so that when the circumstances coincide to produce a practically short circuit of the main conductors the solenoid F will be so strongly energized that it will separate the carbon blocks G and H, producing a brilliant arc between them, which, though it may exist for but a short time, will necessarily be observed by the engineer, and any precautions taken that may to him seem necessary.

In Fig. 2 is shown a more elaborate form of apparatus, comprising a box desirably lined with asbestos or other non-combustible material, and having a transparent front or face. In this form the solenoid F is replaced by a solenoid, F', the plunger $f'$ of which carries a carbon, $g$, which abuts against a stationary carbon, $g'$, in connection with the main circuit-conductor 9. The plunger $f'$ is sustained and the carbons $g$ $g'$ held in contact by a spring, K, the tension of which is regulated by a suitable adjusting-screw—as, for instance, $k$. The main current enters the solenoid by conductor 3, leading direct from one of the commutator-brushes. A resistance, 10, is shown in a derivation spanning the separable carbons $g$ $g'$ for maintaining the main circuit, as described.

As described with reference to Fig. 1, when the current passing through conductor 3 is so strong as to endanger the insulation of the machine, whether motor or generator, the solenoid F will become so strongly energized that it will draw down its plunger and separate the carbon contacts, producing an arc which will operate as a visual signal to the attendant in charge. At the same time, however, the circuit will be maintained through the resistance as well as through the arc and the operation of the device in circuit therewith will not be wholly interrupted.

It will be understood that the apparatus herein shown and specifically described is but one form capable of embodying my invention, and that the structure may be varied within wide limits without departing from the spirit of the invention.

Having described my invention, what I claim, and desire to secure by Letters Patent, is—

1. A safety device for electric motors and generators, comprising the main conductors of a multiple-arc system, an electro-dynamic motor in parallel circuit therewith, an electro-magnetic device in series with the coils of the motor to be protected, a pair of contacts in series with the motor and the electro-magnetic device, and arranged to be separated by the said electro-magnetic device on the presence of an abnormal current in the motor-circuit, and a shunt-circuit spanning the separable contacts and including a resistance through which main current may pass when the contacts are separated by an abnormal flow of current in the motor-circuit, substantially as described.

2. In a safety device for electric motors and generators, the combination, with the main conductors of a multiple-arc system, of an electric motor in parallel circuit therewith, an electro-magnetic device in series with the coils of the motor, one or more movable contacts in circuit with the electro-magnetic device and motor, a lever connected to one of the said contacts and under the influence of the electro-magnetic device, whereby said contacts may be separated upon the passage of an abnormal current in the motor-circuit, and a shunt-circuit spanning the separable contacts and including a resistance through which the main current may pass when the contacts are separated by an abnormal flow of current in the motor-circuit, substantially as described.

3. In a safety device for electric motors and generators, the combination, with the main conductors of a multiple-arc system, of an electric motor in parallel circuit therewith, a solenoid in series with the coils of the motor, a pair of contacts in circuit with the solenoid and motor, a lever attached to one of said contacts and to the plunger of the solenoid for actuating the same for separating said contacts on the passage of an abnormal current in the motor-circuit, and an adjustable tension device for controlling and limiting the operation of the solenoid upon the contacts, and a shunt of relatively high resistance spanning the separable contacts, substantially as described.

In testimony whereof I hereto affix my signature in presence of two witnesses.

CHARLES J. VAN DEPOELE.

Witnesses:
W. A. STILES,
JOHN EASON.